United States Patent
Dsouza et al.

(10) Patent No.: US 11,281,702 B2
(45) Date of Patent: Mar. 22, 2022

(54) SYSTEM AND METHOD FOR RETRIEVING ONE OR MORE DOCUMENTS

(71) Applicant: Wipro Limited, Bangalore (IN)

(72) Inventors: Cyrus Andre Dsouza, Mapusa (IN); Manu Kuchhal, Gurgaon (IN)

(73) Assignee: Wipro Limited, Bangalore (IN)

(*) Notice: Subject to any disclaimer, the term of this patent is extended or adjusted under 35 U.S.C. 154(b) by 150 days.

(21) Appl. No.: 16/196,920

(22) Filed: Nov. 20, 2018

(65) Prior Publication Data

US 2020/0104413 A1 Apr. 2, 2020

(30) Foreign Application Priority Data

Sep. 28, 2018 (IN) .............................. 201841036826

(51) Int. Cl.
*G06F 16/31* (2019.01)
*G06F 16/33* (2019.01)
(Continued)

(52) U.S. Cl.
CPC ........ *G06F 16/313* (2019.01); *G06F 16/3344* (2019.01); *G06F 16/353* (2019.01); *G06F 16/36* (2019.01); *G06F 16/93* (2019.01)

(58) Field of Classification Search
None
See application file for complete search history.

(56) References Cited

U.S. PATENT DOCUMENTS 7,558,778 B2 7/2009 Carus et al.
8,386,240 B2 * 2/2013 Wu ...................... G06F 40/258
704/10

(Continued)

FOREIGN PATENT DOCUMENTS

CN 103903164 A 7/2014

OTHER PUBLICATIONS

Amine et al., "WordNet-based and N-Grams-based Document Clustering: A Comparative Study", 2008 (Year: 2008).*

(Continued)

*Primary Examiner* — Neveen Abel Jalil
*Assistant Examiner* — John J Morris
(74) *Attorney, Agent, or Firm* — Finnegan, Henderson, Farabow, Garrett & Dunner, LLP

(57) ABSTRACT

This disclosure relates generally to an information retrieval technology and more particularly to a creation of a taxonomy to facilitate subsequent search and retrieval of information. In one embodiment, an information retrieval device is disclosed, that comprises a processor and a memory that stores instructions, which, on execution, causes the processor to receive an input corpus. Thereafter, input document clusters are generated from top input n-grams associated with the input corpus. Further, top-ranked input n-grams are determined from the top input n-grams. Thereafter, an external corpus is identified based on the top-ranked input n-grams. An enriched corpus (external and input corpus), is clustered based on top enriched n-grams associated with the enriched corpus to generate enriched document clusters. Further, for each n-gram of the enriched corpus, corresponding n-gram clusters are determined. Finally, creates a taxonomy based on the input document clusters, the enriched document clusters, the n-gram clusters and the top-ranked input n-grams.

13 Claims, 5 Drawing Sheets

(51) Int. Cl.
*G06F 16/35* (2019.01)
*G06F 16/36* (2019.01)
*G06F 16/93* (2019.01)

(56) References Cited

U.S. PATENT DOCUMENTS

| | | | |
|---|---|---|---|
| 9,645,999 B1* | 5/2017 | Ciulla | G06F 16/358 |
| 2003/0154071 A1* | 8/2003 | Shreve | G06F 40/58 |
| | | | 704/9 |
| 2005/0278362 A1 | 12/2005 | Maren et al. | |
| 2009/0043797 A1* | 2/2009 | Dorie | G06F 16/355 |
| 2016/0026634 A1* | 1/2016 | Allen | G06N 5/02 |
| | | | 707/740 |
| 2016/0171063 A1* | 6/2016 | Kiciman | G06Q 50/01 |
| | | | 707/602 |
| 2018/0225374 A1* | 8/2018 | Alba | G06F 16/353 |

OTHER PUBLICATIONS

Kanimozhi et al., "A Novel Map-Reduce Based Augmented Clustering Algorithm for Big Text Datasets", 2018 (Year: 2018).*

* cited by examiner

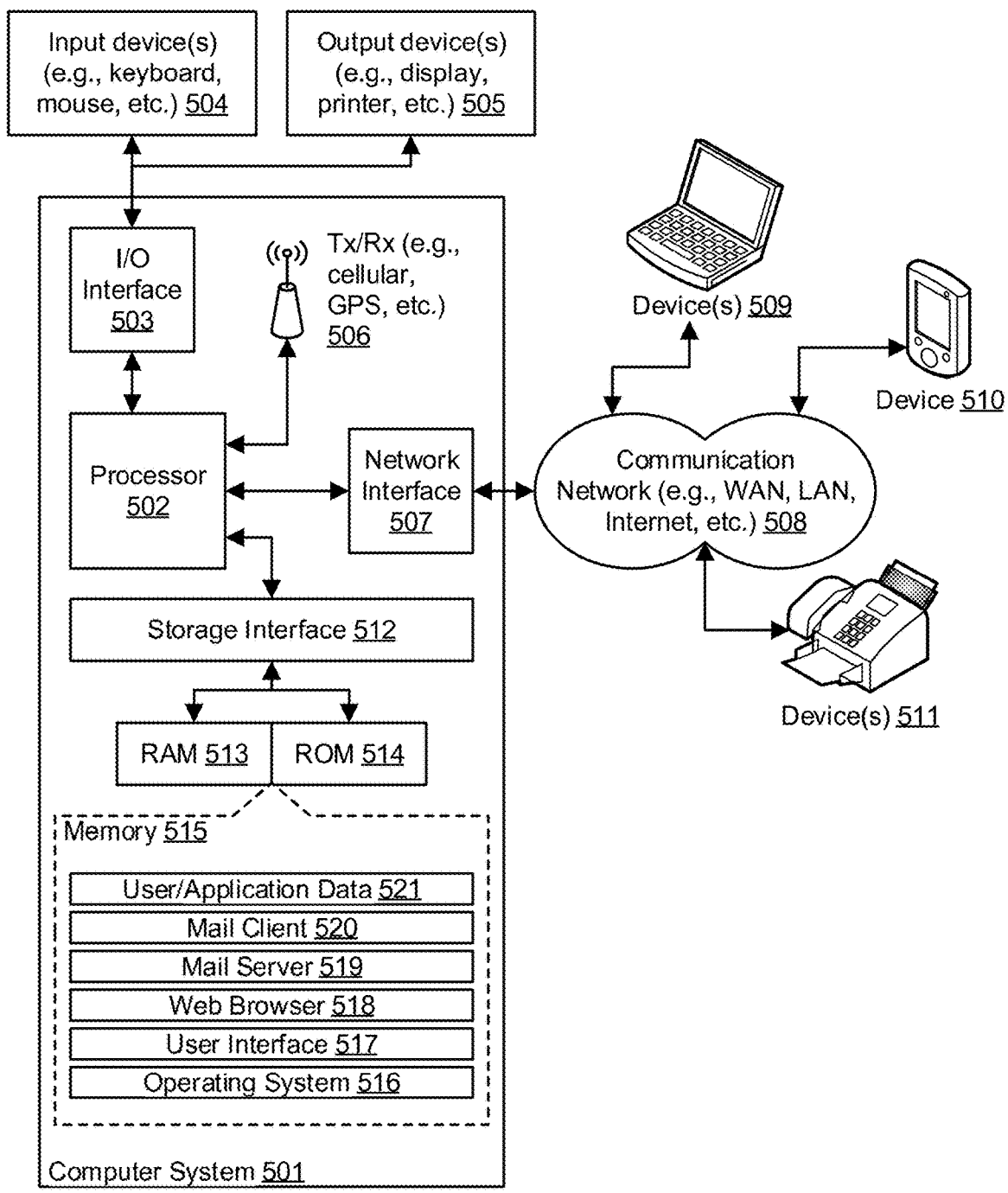
FIG. 5: Example Computer System

SYSTEM AND METHOD FOR RETRIEVING ONE OR MORE DOCUMENTS

This application claims the benefit of Indian Patent Application Serial No. 201841036826, filed Sep. 28, 2018, which is hereby incorporated by reference in its entirety.

FIELD

This disclosure relates generally to an information retrieval technology and more particularly to a creation of a taxonomy to facilitate subsequent search and retrieval of information.

BACKGROUND

Advancement of Information retrieval technology has created a wealth of information that is available at user's fingertip. Both machine and human-generated data are experiencing an exponential growth. This increase in data has created a requirement for users to reform queries, to get more relevant results. However, the user might not be able to accurately recollect specific facts that might assist in retrieving particular documents. For instance, the user might be attempting to retrieve a mail from an inbox and the user may be unable to recollect the subject line of the mail. Presently, in order to retrieve the mail, the user might have to use a search string that contains terms used in the mail. Similarly, there might be scenarios where terms used in a user query may not be present verbatim in an input corpus. Yet the required result might still be present in the input corpus.

Hence there arises a need to relate the terms used in the user query with the terms used in the input corpus so that the required document set may be retrieved from the input corpus and presented to the user. Additionally, there arises a need to detect words in the input corpus that can be mapped to an external domain, thus broadening the scope of information retrieval.

SUMMARY

In an embodiment, the present disclosure illustrates a method of retrieving one or more documents. The method comprises receiving an input corpus and determining one or more top input n-grams from the input corpus. The input corpus may include one or more input documents. The determined top input n-grams are used to generate one or more input document clusters. The method further comprises, determining one or more top-ranked input n-grams from the top input n-grams. Thereafter, an external corpus is identified based on the top-ranked input n-grams. The external corpus is merged with the input corpus to generate an enriched corpus. Further, one or more enriched document clusters are generated by clustering the enriched corpus based on one or more top enriched n-grams associated with the enriched corpus. For each n-gram of the enriched corpus, one or more n-gram clusters are determined. Thereafter, a taxonomy is created based on the input document clusters, the enriched document clusters, the n-gram clusters, and the top-ranked input n-grams. Finally, one or more documents may be retrieved from the enriched corpus based on the taxonomy.

In another embodiment, an information retrieval device for retrieving one or more documents is disclosed. The information retrieval device comprises a processor and a memory communicatively coupled to the processor. The memory stores processor instructions, which, on execution, causes the processor to receive an input corpus, wherein the input corpus comprises one or more input documents. The memory further includes instructions to determine one or more top input n-grams associated with the input corpus. The determined top input n-grams are used to generate one or more input document clusters. The memory further includes instructions to determine one or more top-ranked input n-grams from the top input n-grams. The memory further includes instructions to identify an external corpus based on the top-ranked input n-grams. Instructions to generate an enriched corpus by merging the external corpus with the input corpus is also included in the memory. Further, the memory includes instructions to generate one or more enriched document clusters by clustering the enriched corpus based on one or more top enriched n-grams associated with the enriched corpus. Additionally, the memory includes instructions to determine one or more n-gram clusters corresponding to each n-gram of the enriched corpus. Further, the memory includes instructions to create a taxonomy based on the input document clusters, the enriched document clusters, the n-gram clusters and the top-ranked input n-grams. Additionally, the memory also includes instructions to retrieve one or more documents from the enriched corpus based on the taxonomy.

In an embodiment, the present disclosure relates to a non-transitory computer readable medium including instructions stored thereon that when processed by at least one processor may cause a system to receive an input corpus, wherein the input corpus comprises one or more input documents. The instructions further cause the processor to determine one or more top input n-grams associated with the input corpus, wherein the one or more top input n-grams are used to generate one or more input document clusters. The instructions thereafter cause the processor to determine one or more top-ranked input n-grams from the one or more top input n-grams, wherein the one or more top-ranked input n-grams are determined based on relatedness of a top input n-gram with each top input n-gram. The instructions further cause the processor to identify an external corpus based on the one or more top-ranked input n-grams. The instructions thereafter cause the processor to merge the external corpus with the input corpus to generate an enriched corpus. The instructions further cause the processor to cluster the enriched corpus based on one or more top enriched n-grams associated with the enriched corpus to generate one or more enriched document clusters. The instructions further cause the processor to determine one or more n-gram clusters corresponding to each n-gram of the enriched corpus, wherein each of the one or more n-gram clusters comprises semantically related n-grams corresponding to each n-gram of the enriched corpus. The instructions thereafter cause the processor to create a taxonomy based on the one or more input document clusters, the one or more enriched document clusters, the one or more n-gram clusters and the one or more top-ranked input n-grams. The instructions further cause the processor to retrieve one or more documents from the enriched corpus based on the taxonomy.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for retrieving one or more documents. The system and method may be implemented in a variety of computing systems.

Working of the systems and methods for retrieving one or more documents is described in conjunction with FIG. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
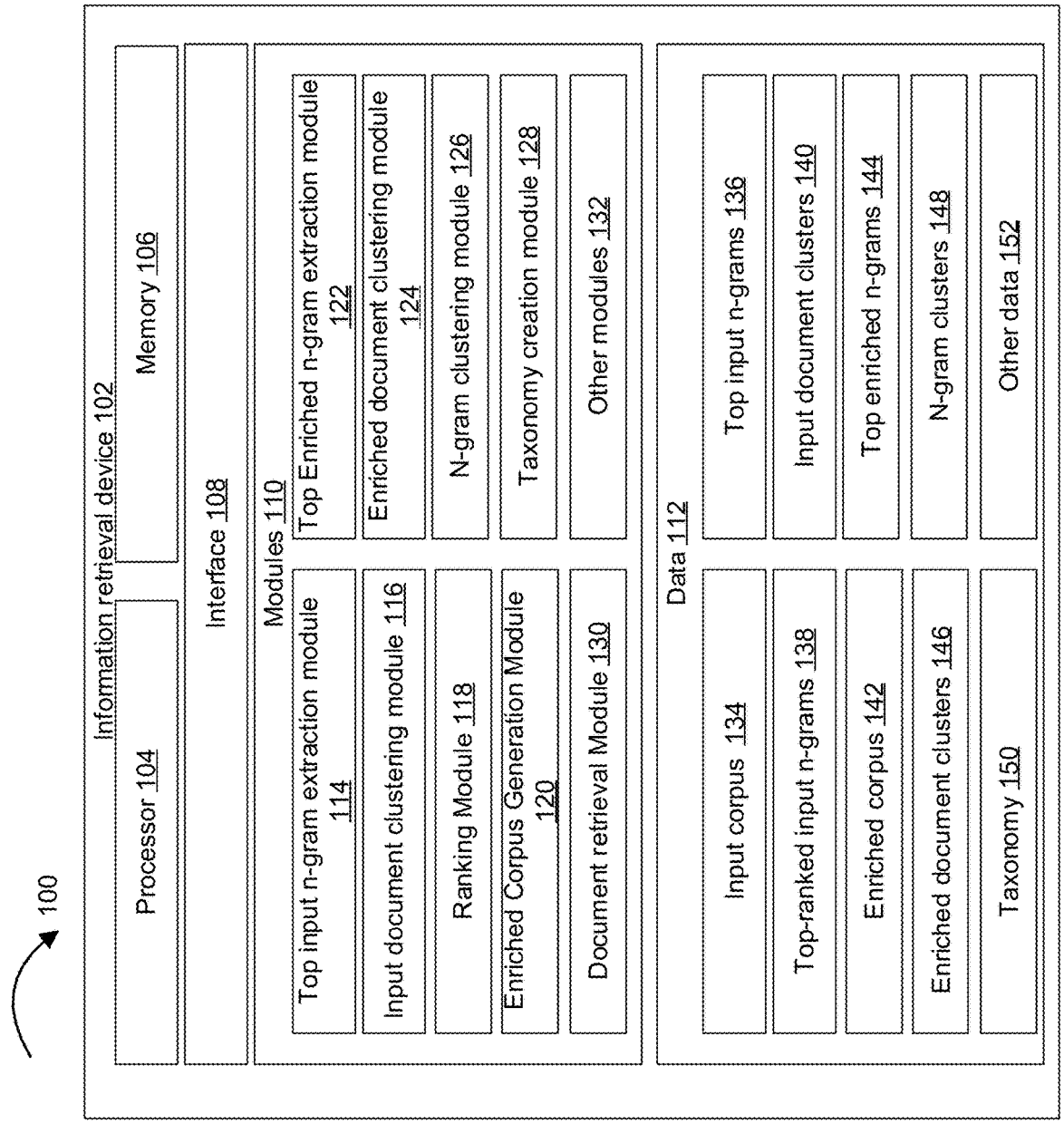
FIG. 1 illustrates an exemplary implementation comprising an information retrieval device for retrieving one or more documents, according to some embodiments of the present disclosure.

FIG. 1 illustrates an exemplary environment 100 comprising an information retrieval device 102, according to some embodiments of the present disclosure. As shown in FIG. 1, the information retrieval device 102 comprises a processor 104, a memory 106 coupled to the processor 104 and interface(s) 108. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor 104 is configured to fetch and execute computer-readable instructions stored in the memory 106. The memory 106 can include any non-transitory computer-readable medium known in the art including, for example, volatile memory (e.g., RAM), and/or non-volatile memory (e.g., EPROM, flash memory, etc.).

The interface(s) 108 may include a variety of software and hardware interfaces, for example, a web interface, a graphical user interface, etc., allowing the Information retrieval device 102 to interact with user devices. Further, the interface(s) 108 may enable the information retrieval device 102 to communicate with other computing devices.

In one example, the information retrieval device 102 may include modules 110 and data 112. In one embodiment, the modules 110 and the data 112 may be stored within the memory 106. In one example, the modules 110, amongst other things, include routines, programs, objects, components, and data structures, which perform particular tasks or implement particular abstract datatypes.

In one implementation, the modules 110 may include a top input n-gram extraction module 114, an input document clustering module 116, a ranking module 118, an enriched corpus generation module 120, a top enriched n-gram extraction module 122, an enriched document clustering module 124, a n-gram clustering module 126, a taxonomy creation module 128 and a document retrieval module 130. In some embodiments, the modules 110 may include other modules 132 to perform various miscellaneous functionalities of the information retrieval device 102. It will be appreciated that the aforementioned modules may be represented as a single module or a combination of different modules.

The data 112 serves, among other things, as a repository for storing data fetched, processed, received and generated by one or more of the modules 110. In one implementation, the data 112 may include an input corpus 134, one or more top input n-grams 136, one or more top-ranked input n-grams 138, one or more input document clusters 140, an enriched corpus 142, one or more top enriched n-grams 144, enriched document clusters 146, one or more n-gram clusters 148 and a taxonomy 150. In one embodiment, the data 112 may be stored in the memory 106 in the form of various data structures. In an example, the data may also comprise other data 152 including temporary data and temporary files, generated by the modules 110 for performing the various functions of the information retrieval device 102.

Figure 2:
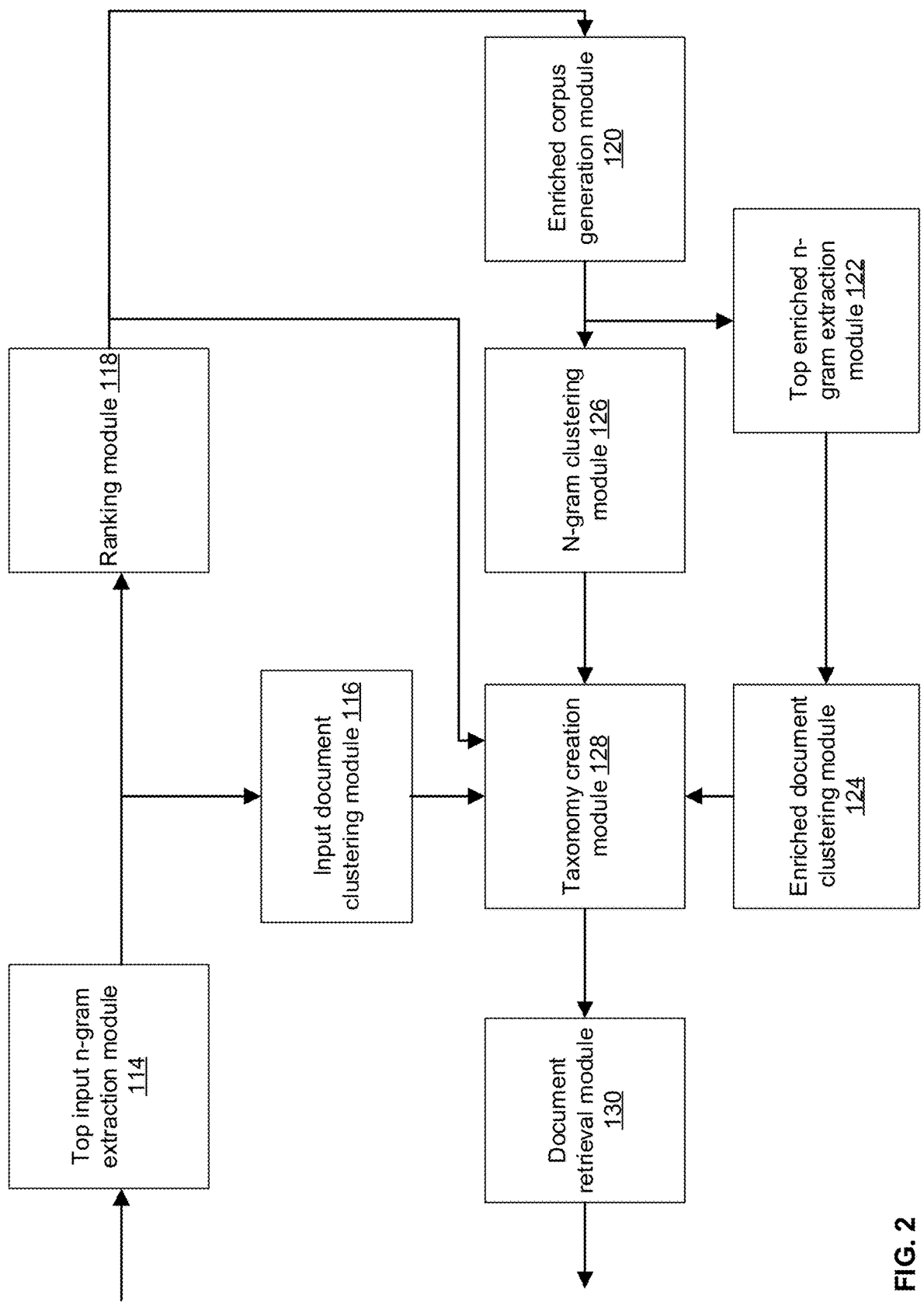
FIG. 2 is a block diagram illustrating the various modules of the information retrieval device, in accordance with some embodiments of the present disclosure.

FIG. 2 is a block diagram illustrating the various modules 110 of the information retrieval device 102, in accordance with some embodiments of the present disclosure. The information retrieval device 102, more specifically, the top input n-gram extraction module 114 may receive the input corpus 134. The input corpus 134 may include one or more input documents. In one embodiment, the input documents may be curated. Curation of the input documents may include removal of encoding issues, punctuations, invalid characters and stop words. The curation step may further include lexicon normalization and case normalization.

After receiving the input corpus 134, the top input n-gram extraction module 114 may determine one or more top input n-grams 136 for each input document. Here, an n-gram may include a word, a phrase, or a multiword. In order to determine the top input n-grams 136, initially, one or more input n-grams may be extracted from the input corpus 134. This may be implemented by any keyword extraction algorithm known in the field of art. For instance, the phrases or the multiword may be extracted by using Rapid Automatic Keyword Extraction (RAKE) algorithm. In one embodiment, the determined phrases may be classified as "noun phrases" or "verb phrases".

Thereafter, Term Frequency-Inverse Document Frequency (TF-IDF) scores are calculated for each input n-gram in the input corpus 134. The TF-IDF score is directly proportional to the number of times an n-gram appears in a document and inversely proportional to the number of documents in the input corpus 134, that contains the n-gram. Thus, the TF-IDF scores indicate how frequently an n-gram occurs in a document as opposed to the entire input corpus 134 and reflects how important a word is to a document in the input corpus 134. Finally, the top input n-grams 136 may be determined by identifying input n-grams that have a TF-IDF score greater than a predefined threshold. In one embodiment the predefined threshold may be user-defined. The top input n-grams 136 may indicate input topics associated with each input document.

Once the top input n-grams 136 are determined, the input document clustering module 116 may generate one or more input document clusters 140. In one embodiment, the input corpus 134 may be clustered based on the top input n-grams 136 by implementing a k-means clustering algorithm. In an embodiment, the input corpus 134 may be clustered into 'n' number of clusters and 'n' may be determined by an elbow method. In some embodiments, each of the input document clusters 140 may be labeled by the corresponding top input n-gram 136, that has the highest TF-IDF score. In another embodiment, the input document clusters 140 may be manually labeled. In one embodiment, each of the input document cluster 140 may contain documents and corresponding to each document there may be a cluster of top input n-grams 136 that may be associated with the document.

Once the top input n-grams 136 are determined, the ranking module 118 may rank the top input n-grams 136 to determine one or more top-ranked input n-grams 138. In one embodiment, the top-ranked input n-grams 138 are determined by using Latent Dirichlet Allocation (LDA) algorithm and Gibbs sampling. In Gibbs sampling, an n-gram may be randomly selected from the top input n-grams 136. After this, a comparison is made with the selected top input n-gram and the top input n-grams 136. The n-grams that are closely related to the selected top input n-gram are grouped together. For each selected top input n-gram, a relatedness may be determined. The relatedness indicates the number of top input n-grams 136 that are related to the selected top input n-gram. The top-ranked input n-grams 138 are the top input n-grams 136 that have relatedness above a predefined threshold value. In one embodiment, the predefined threshold value may be user-defined. In one illustration, "CREDIT", "DEBIT", "CARD", "FRAUD", "PIN", and "BEWARE" may be the top input n-grams 136. "CREDIT", "DEBIT" and "CARD" may be grouped together because these words are related to each other. The relatedness for the selected top input n-gram ("CARD") may be 3. In the illustration, the predefined threshold for the relatedness may be 2. In the same illustration, the top-ranked input n-gram 138 may be "CARD". In the same illustration, "FRAUD", "PIN" and "BEWARE" may be grouped together. The relatedness for the selected top input n-gram ("PIN") may be 3. In the illustration, the predefined threshold for the relatedness may be 2. In the same illustration, the top-ranked input n-gram 138 may be "PIN" (personal identification number).

Upon determining the top-ranked input n-grams 138, an external corpus may be identified based on the top-ranked input n-grams 138. The external corpus may include one or more external documents. The external corpus may be identified by querying one or more external databases with the top-ranked input n-grams 138. For example, the top-ranked input n-gram 138 may be "ATM CARD". In the illustration, a Google® search may be done with "ATM CARD" to retrieve several external documents. Amongst the external documents there might be Wikipedia® pages on "DEBIT CARD" and "CREDIT CARD", as well as instructions on "how to activate ATM cards". Additionally, the external documents may also contain news clippings of "CREDIT CARD FRAUDS" and "ATM CARD THEFT". The external documents may be stored in an internal database against the top-ranked input n-gram 138, i.e., "ATM CARD". This ensures that the next time the same n-gram comes up as a top-ranked input n-gram 138 the relevant documents may be directly retrieved from the internal database instead of querying the external database again. In the illustration, the external documents may be stored in a database against the n-gram "ATM CARD".

Upon identification of the external corpus, the enriched corpus generation module 120 may merge the external corpus with the input corpus 134 to generate the enriched corpus 142. By merging the external corpus with the input corpus 134, the scope of information retrieval may be extended. Initially, the information retrieval may be limited to the data present in the input corpus 134. After generation of the enriched corpus 142, the information retrieval may be extended to the enriched corpus 142 as well.

After generating the enriched corpus 142, one or more enriched document clusters 146 may be generated by the enriched document clustering module 124 by clustering the enriched corpus 142 with the one or more top enriched n-grams 144 associated with the enriched corpus 142. The top enriched n-grams 144 may be determined by the top enriched n-gram extraction module 122. In order to determine the top enriched n-grams 144, initially, one or more enriched n-grams may be extracted from the enriched corpus 142. Here, the one or more enriched n-grams correspond to n-grams associated with the enriched corpus 142. The enriched n-grams may be determined by any keyword extraction algorithm that is known in the field of art. For instance, the phrases or the multiword may be extracted by using RAKE algorithm. Thereafter, the TF-IDF scores are calculated for each enriched n-gram in the enriched corpus 142. The calculated TF-IDF scores indicate how frequently an n-gram occurs in a document as opposed to the entire enriched corpus 142. Finally, the top enriched n-grams 144 may be determined by identifying enriched n-grams that have a TF-IDF score greater than a predefined threshold. In one embodiment, the predefined threshold may be user-defined. The top enriched n-grams 144 may indicate enriched topics associated with each enriched corpus 142.

The determined top enriched n-grams 144, may be used to generate the enriched document clusters 146. In one embodiment, the enriched corpus 142 may be clustered based on the top enriched n-grams 144 by implementing a k-means clustering algorithm. In an embodiment, the enriched corpus 142 may be clustered into 'n' number of clusters and 'n' may be determined by an elbow method. In some embodiments, each of the enriched document clusters 146 may be labeled by the corresponding top enriched n-gram 144, that has the highest TF-IDF score. In another embodiment, the enriched document clusters 146 may be manually labeled. In one embodiment, the top enriched n-grams 144 may be used to build a domain dictionary. Since the enriched document cluster 146 is generated based on top enriched n-grams 144 and since the top enriched n-grams 144 indicate the enriched topics, this implies that the n-grams in the same enriched document cluster 146 are all part of the same domain. Hence the domain dictionary may be built using the top enriched n-grams 144 and the enriched document clusters 146.

After determining the enriched document clusters 146, one or more n-gram clusters 148 may be determined for each n-gram of the enriched corpus 142, by the n-gram clustering module 126. Here, the n-gram clustering module 126 determines semantically related n-grams for a given n-gram. Each of these semantically related n-grams together constitute an n-gram cluster. In one embodiment, all the n-grams in the enriched corpus 142 may be converted to vectors. This may be done using Global Vectors for Word Representation (GLOVE) algorithm, word2vec algorithm, or FastText algorithm. In addition to these algorithms, a skip-gram or a Continuous Bag of Words (CBOW) model may be used. The vectors that indicate all the n-grams in the enriched corpus 142 may be clustered using an LDA clustering algorithm. These clusters may be referred to as n-gram vector clusters. The n-gram vector clusters thus formed indicate n-grams that are in the same semantic space, but not necessarily in the same document set. This implies that the same cluster may comprise n-grams from the input documents as well as the external documents.

After determining the n-gram clusters 148, a taxonomy 150 may be created by the taxonomy creation module 128, based on the input document clusters 140, the enriched document clusters 146, the n-gram clusters 148, and the top-ranked input n-grams 138. The taxonomy 150 defines at least one relationship between the input document clusters 140, the enriched document clusters 146, the n-gram clusters 148, and the top-ranked input n-grams 138. The at least one relationship may include semantic relationship, contextual relationship or co-occurring relationship. Embodiments explained in the following paragraphs are not meant to limit the scope of the present patent application. In order to determine the at least one relationship between the input document clusters 140, the enriched document clusters 146, the n-gram clusters 148, and the top-ranked input n-grams 138, one or more following embodiments may be performed.

In an embodiment, for each top-ranked input n-grams 138, the corresponding input document cluster 140 may be determined. Each input document cluster 140 may include documents and each document may further contain cluster of top input n-grams 136 corresponding to each document. The n-grams that surround each top-ranked input n-gram 138 in the corresponding input document cluster 140, may be referred to as Cluster level related n-grams. The relationship between these n-grams and the top-ranked input n-gram 138 may be contextual in nature because they are used in the same context. This is because the input document clusters 140 were generated based on the top input n-grams 136 and the top input n-grams 136 indicate the input topics associated with the input corpus 134. This means that the cluster level related n-grams and the top-ranked input n-gram 138 all belong to the same domain.

In an embodiment, for each top-ranked input n-gram 138, the corresponding enriched document cluster 146 may be determined. The n-grams that surround each top-ranked input n-gram 138 in the corresponding enriched document cluster 146, may be referred to as Domain related n-grams. The relationship between the domain related n-grams and the top-ranked input n-gram 138 may be contextual in nature. This is because the enriched document clusters 146 may be generated based on the top enriched n-grams 144 and the top enriched n-grams 144 may indicate the enriched topics associated with the enriched corpus 142. This implies that the domain related n-grams and the top-ranked input n-gram 138 all belong to the same domain.

In an embodiment, for each top-ranked input n-gram 138, the corresponding n-gram vector cluster that contains the top-ranked input n-gram 138 may be determined. The n-grams that surround the top-ranked input n-gram 138 in the n-gram vector cluster may be semantically related to the top-ranked input n-gram 138. For instance, the top-ranked input n-gram 138 may be WiproR. Then the semantically related terms that surround the top-ranked input n-gram 138 WiproR, may be InfosysR, TCSR, etc. The n-grams that are closest to the top-ranked input n-gram 138 in the vector space may also indicate the n-gram that is most semantically related to the top-ranked input n-gram 138. The corresponding input document cluster 140 that contains the closest n-grams may be traced. The n-grams that surround the closest n-gram in the corresponding input document cluster 140 may be referred to as domain specific semantically related n-gram.

After creating the taxonomy 150, one or more documents may be retrieved from the enriched corpus 142 in response to a query by the user based on the taxonomy 150.

When a user query contains an n-gram that may be contextually similar to a top-ranked input n-gram 138 but yet may not be present in the input corpus 134, verbatim, the information retrieval device 102 realizes that the input document cluster 140 corresponding to the top-ranked input n-gram 138 may be relevant. Hence, the information retrieval device 102 retrieves the documents in the corresponding input document cluster 140 and presents it to the user. When the information retrieval device 102 is queried by the user, initially, the keywords from the user query may be identified. After that, for each identified keyword, the corresponding n-gram vector cluster that contains the identified keyword may be determined. Thereafter, a cosine similarity algorithm may be implemented between the vector of the identified keyword and all n-gram vectors in the corresponding n-gram vector cluster. As a result of the implemented algorithm, contextual similarity scores may be generated, that indicates the similarity of each n-gram of the n-gram vector cluster with the identified keyword. These contextual similarity scores may be sorted from high to low. Amongst the n-grams that have scored above a predefined threshold, the identified keyword itself may be removed. After removal, the n-gram that scored second highest may be identified. The n-gram that has scored second highest may be mapped to the input document cluster 140. However, if the n-gram that has scored second highest does not have a corresponding input document cluster 140, then that may be removed. The n-gram that scored the third highest score may be identified. Once the corresponding input document cluster 140 is determined, the documents in the corresponding input document cluster 140 may be retrieved and presented to the user.

In one illustration, the identified keyword may be "CARD". The corresponding n-gram vector cluster that contains the n-gram "CARD" may be identified. Thereafter, cosine similarity between the vector of the n-gram "CARD", and vectors of "CARD", "PIN", "OFFENCE", "ILLEGAL", "FRAUD", "CHARGE", "LIABLE" and "BEWARE", may be determined to identify contextual similarity scores. These contextual similarity scores may indicate a similarity between each n-gram and "CARD". These contextual similarity scores may be sorted from high to low as shown in Table 1.

TABLE 1

| N-gram | Contextual Similarity Score |
|---|---|
| CARD | 1 |
| FRAUD | 0.8 |
| PIN | 0.7 |
| OFFENCE | 0.6 |
| ILLEGAL | 0.5 |
| CHARGE | 0.4 |
| LIABLE | 0.3 |
| BEWARE | 0.2 |

In the same illustration, the highest similarity score may correspond to "CARD" itself. This may be ignored. The second highest score corresponds to the n-gram "FRAUD". The input document cluster 140 that corresponds to the n-gram "FRAUD" may be identified. The documents corresponding to the input document cluster 140 may be retrieved and presented to the user.

When a user query contains an n-gram that may be semantically similar to a top-ranked input n-gram 138 but yet may not be present in the input corpus 134, verbatim, the information retrieval device 102 realizes that the input document cluster 140 corresponding to the top-ranked input n-gram 138 may be relevant. When the information retrieval device 102 is queried by a user, initially, the keywords from the user query may be identified. Thereafter, for each identified keyword, the corresponding n-gram vector cluster may be identified. The n-grams closest to the identified keyword in the vector space may also indicates the most semantically related n-grams to the identified keyword. The corresponding input document cluster 140 to the semantically closest n-gram may be identified. The documents in the corresponding input document cluster 140 may be retrieved and presented to the user.

When a user query contains an n-gram that generally tends to co-occur with the top-ranked input n-gram 138 but yet may not be present in the input corpus 134, verbatim, the information retrieval device 102 realizes that the input document cluster 140 corresponding to the top-ranked input n-gram 138 may be relevant. When the information retrieval device 102 is queried by a user, initially, the keywords from the user query may be identified. By using a text adjacency graph, a limited span of 1-grams may be determined before and after the top-ranked input n-gram 138 in the documents. Thereafter, the number of times the identified keyword appears along with the top-ranked input n-gram 138 may be identified. This may be used to determine co-occurrence scores. When the co-occurrence score is above a predefined threshold, then the identified keyword and the top-ranked input n-gram 138 may be co-occurring n-grams and the relationship between them may be co-occurring in nature. The input document cluster 140 corresponding to the top-ranked input n-gram 138 may be retrieved and presented to the user. For instance, when the user queries "I need information about HolmesR", the information retrieval device 102 realizes that HolmesR has a high co-occurrence score (above the predefined threshold) with the top-ranked input n-gram 138, "WiproR". So the input document cluster 140 corresponding to "WiproR" may be identified and the documents may be retrieved from the corresponding input document cluster 140 and presented to the user.

In one illustration, a user may query the information retrieval device 102 for installing LED Printer, "How do I install LED Printer?". The input corpus 134 may contain information regarding the methodology to be followed to install 2D and 3D printers. However, the input corpus 134 may not contain the n-gram "LED PRINTER". But the enriched corpus 142 may contain the n-gram "LED PRINTER". By finding the cosine similarity between the vector of "LED PRINTER" and the n-gram vector cluster that contains the vector of "LED PRINTER", it may be evident that "2D PRINTER" and "LED PRINTER" are contextually similar. Thereafter, the input document cluster 140 corresponding to the "2D PRINTER" may be identified and the documents from the input document cluster 140 may be retrieved and displayed to the user.

In one embodiment, the relationship between the input document clusters 140, the enriched document clusters 146, the top-ranked input n-gram 138 and the n-gram cluster 148 may be used to generate topic clusters. In another embodiment, the relationship between the input document clusters 140, the enriched document clusters 146, the top-ranked input n-gram 138 and the n-gram cluster 148 may be used to generate knowledge graphs. The knowledge graphs may comprise nodes that indicate n-grams. Additionally, there may be lines connecting the n-grams and a number above a line connecting 2 n-grams may indicate how close the 2 n-grams are to each other. For instance, the line connecting "UMBRELLA" and "SUN" may have 0.5 above it, while the line connecting "UMBRELLA" and "RAIN" may have 0.8 above it. This may indicate that according to the enriched corpus 142 the n-gram "UMBRELLA" may be closer to "RAIN" than it is to "SUN".

Figure 3:
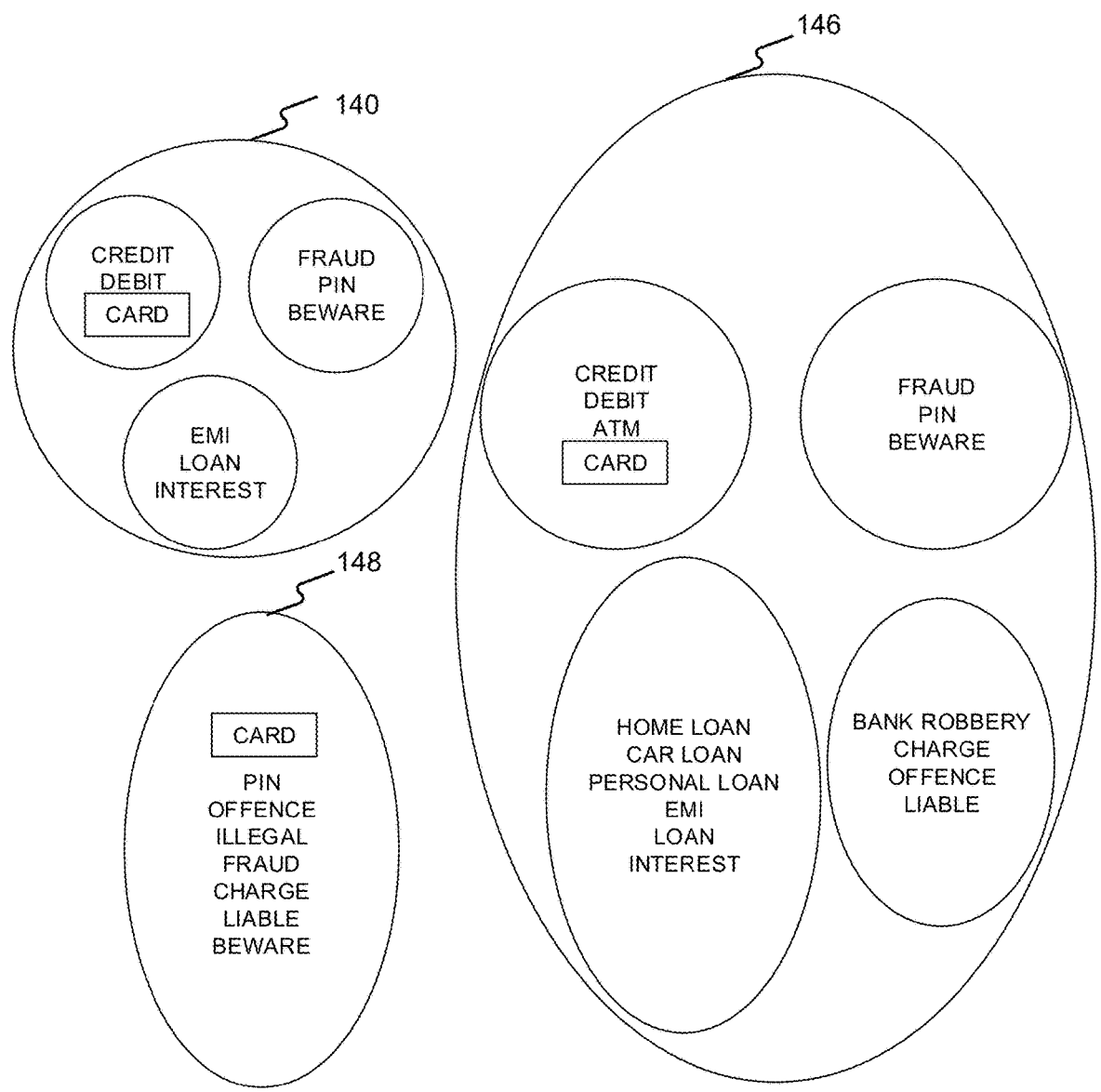
FIG. 3 is an illustrative diagram indicating one or more input document clusters, one or more enriched document clusters, one or more n-gram clusters and one or more top-ranked input n-grams for creating a taxonomy, in accordance with some embodiments of the present disclosure.

FIG. 3 is an illustrative diagram indicating one or more input document clusters 140, one or more enriched document clusters 146, one or more n-gram clusters 148 and one or more top-ranked input n-grams 138 for creating a taxonomy 150, in accordance with some embodiments of the present disclosure. The input document clusters 140 contain documents and each document in turn contains a cluster of top input n-gram 136 associated with each document. In the illustration, "CARD" may be the top-ranked input n-gram 138. The input document cluster 140 that contains the n-gram "CARD", may be identified. The other n-grams in the input document cluster 140, i.e. "CREDIT" and "DEBIT" are top input n-grams 136 from the same document that spoke of the n-gram "CARD". "CREDIT" and "DEBIT" may be referred to as cluster level related n-grams. The relationship between "CREDIT" and "CARD" may be contextual in nature.

In the same illustration, the enriched document cluster 146 that contains the top-ranked input n-gram 138, "CARD" may be identified. The enriched document clusters 146 contain documents and each document in turn contains a cluster of top enriched n-gram 144 associated with each document. The n-grams that surround the n-gram "CARD" in the enriched document cluster 146, i.e., "CREDIT", "DEBIT" and "ATM" may be referred to as domain related n-grams. The relationship between "CARD" and "ATM" may be contextual in nature.

In the same illustration, the n-gram clusters 148 may be converted to n-gram vector clusters by using one of GLOVE algorithm, word2vec algorithm or FastText algorithm. These vectors may be represented such that n-grams that are in the same semantic space may be close to each other. The n-grams that surround the top-ranked input n-gram 138, "CARD" in the corresponding n-gram vector cluster may be semantically related to the top-ranked input n-gram 138. In the illustration, the n-grams "PIN", "OFFENCE", "ILLEGAL", "FRAUD", "CHARGE", "LIABLE" and "BEWARE, may be semantically related to the n-gram "CARD".

The n-grams that are closest to the top-ranked input n-gram 138 in the vector space may also indicate the n-gram that is most semantically related to the top-ranked input n-gram 138. The corresponding input document cluster 140 that contains the closest n-grams may be traced. The n-grams that surround the closest n-gram in the corresponding input document cluster 140 may be referred to as domain specific semantically related n-grams. In the present illustration, the n-gram closest to the top-ranked input n-gram 138 may be "FRAUD". The corresponding input document cluster 140 that contains the n-gram "FRAUD", may be identified. The n-grams, "PIN" and "BEWARE" may be the domain specific semantically related n-gram in the illustration.

In the same illustration, by using a text adjacency graph, a limited span of 1-grams may be determined before and after the top-ranked input n-gram 138, "CARD". For instance, the limited span may be one 1-gram. Thereafter, the number of times a particular 1-gram appears along with the n-gram "CARD" may be identified. This may be used to determine co-occurrence scores. Table. 2 indicates one 1-gram before and after the top-ranked input n-gram 138. In Table. 2, scores indicate the corresponding co-occurring scores. In the illustration, the threshold score may be 0.5. This means the co-occurring terms may be "DEBIT CARD", "CREDIT CARD" and "ATM CARD". The relationship between "ATM" and "CARD" may be referred to as co-occurring relationship.

TABLE 2

| Before | Score | After | Score |
| --- | --- | --- | --- |
| DEBIT CARD | 0.7 | CARD FRAUD | 0.4 |
| CREDIT CARD | 0.8 | CARD STOLEN | 0.3 |
| ATM CARD | 1 | CARD HOLDER | 0.2 |

The taxonomy 150 is a representation of the above determined relationship between the input document cluster 140, the enriched document cluster 146, the n-gram clusters 148 and the top-ranked input n-grams 138.

Figure 4:
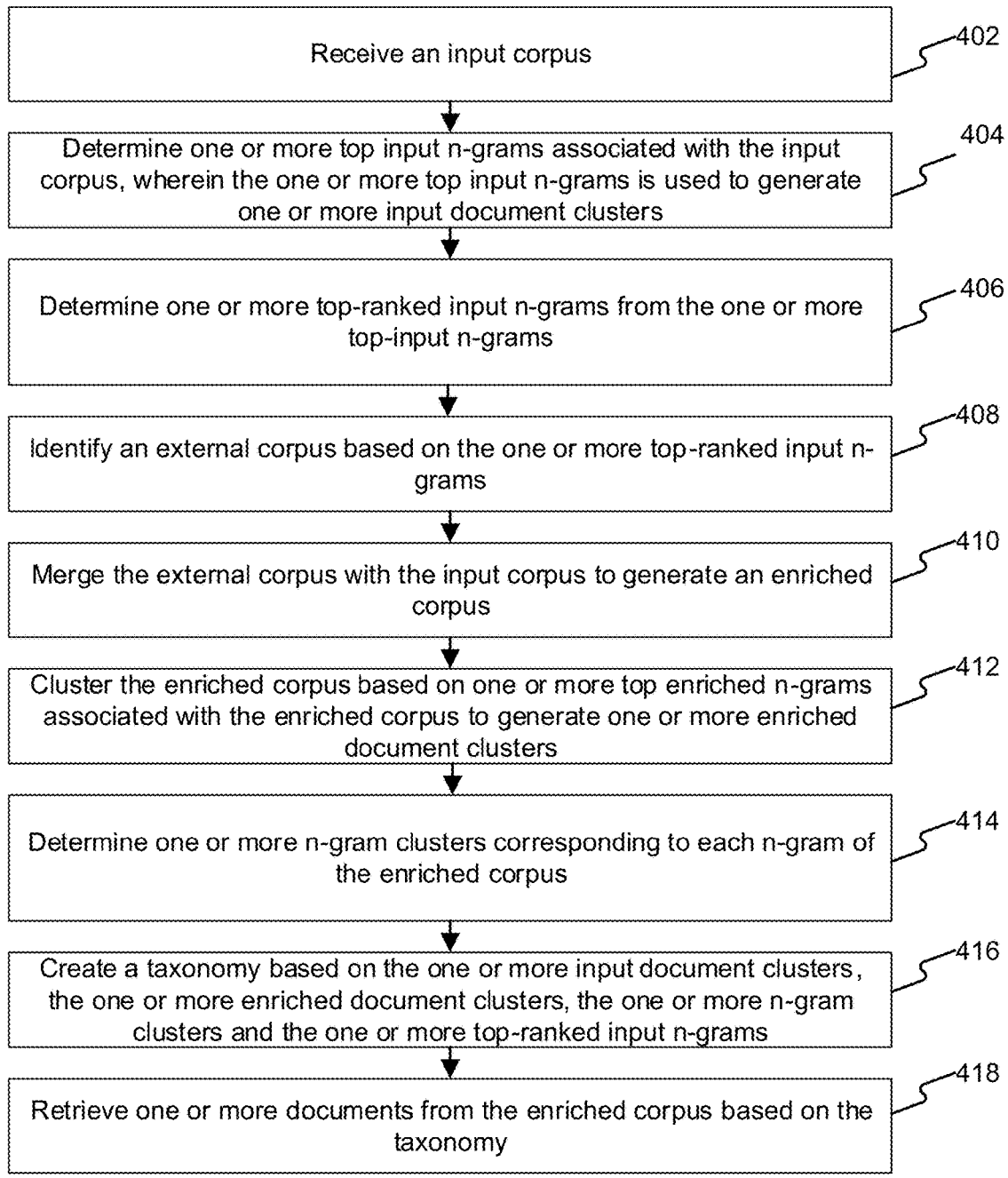
FIG. 4 is a flow diagram illustrating a method of retrieving one or more documents in accordance with some embodiments of the present disclosure.

FIG. 4 is a flow diagram illustrating a method of retrieving one or more documents in accordance with some embodiments of the present disclosure. At step 402, an input corpus 134 may be received. The input corpus 134 may include one or more input documents. In one embodiment, the input documents may be curated. Curation of the input documents may include removal of encoding issues, punctuations, invalid characters and stop words. The curation step may further include lexicon normalization and case normalization.

After receiving the input corpus 134, one or more top input n-grams 136 may be determined for each input document, at step 404. The top input n-grams 136 may include at least one of a word, a phrase, or a multiword. In one embodiment, the top input n-grams 136 may indicate input topics associated with each input document. In order to determine the top input n-grams 136, initially, one or more input n-grams may be extracted from the input corpus 134. This may be implemented by any keyword extraction algorithm known in the field of art. Thereafter, the Term Frequency-Inverse Document Frequency (TF-IDF) scores are calculated for each input n-gram in the input corpus 134. The TF-IDF score is directly proportional to the number of times an n-gram appears in a document and inversely proportional to the number of documents in the input corpus 134, that contains the n-gram. Thus the TF-IDF scores indicate how frequently an n-gram occurs in a document as opposed to the entire input corpus 134. Finally, the top input n-grams 136 may be determined by identifying input n-grams that have a TF-IDF score greater than a predefined threshold. In one embodiment the predefined threshold may be user-defined.

The determined top input n-grams 136, may be used to generate one or more input document clusters 140. In one embodiment, the input corpus 134 may be clustered based on the top input n-grams 136 by implementing a k-means clustering algorithm. In an embodiment, the input corpus 134 may be clustered into 'n' number of clusters and 'n' may be determined by an elbow method. In some embodiments, each of the input document clusters 140 may be labeled by the corresponding top input n-gram 136, that has the highest TF-IDF score. In another embodiment, the input document clusters 140 may be manually labeled. In one embodiment, each of the input document cluster 140 may contain documents and corresponding to each document there may be a cluster of top input n-grams 136 that may be associated with the document.

Once the top input n-grams 136 are determined, one or more top-ranked input n-grams 138 may be determined from the top input n-grams 136, at step 406. In one embodiment, the top-ranked input n-grams 138 are determined by using Latent Dirichlet Allocation (LDA) algorithm and Gibbs sampling. In Gibbs sampling, an n-gram may be randomly selected from the top input n-grams 136. After this, a comparison is made with the selected top input n-gram and the top input n-grams 136. The n-grams that are closely related to the selected top input n-gram are grouped together. For each selected top input n-gram, a relatedness is determined. The relatedness indicates the number of top input n-grams 136 that are related to the selected top input n-gram. The top-ranked input n-grams 138 are the top input n-grams 136 that have relatedness above a predefined threshold value. In one embodiment, the predefined threshold value may be user-defined.

Upon determining the top-ranked input n-grams 138, an external corpus may be identified based on the top-ranked input n-grams 138, at step 408. The external corpus may be identified by querying one or more external databases with the top-ranked input n-grams 138. The external documents may be stored in an internal database against the top-ranked input n-gram 138. This ensures that when the same top-ranked input n-gram 138 requests for relevant documents, the same may be retrieved from the internal database instead of the external database. By using phrases and multiword instead of words, external documents that are more relevant to the top-ranked input n-gram 138 may be obtained. This ensures that the next time the same n-gram comes up as a top-ranked input n-gram 138 the relevant documents may be directly retrieved from the internal database instead of querying the external database again.

Upon identification of the external corpus, the enriched corpus 142 may be generated by merging the external corpus with the input corpus 134, at step 410. By merging the external corpus with the input corpus 134, the scope of information retrieval may be extended. Initially, the information retrieval may be limited to the data present in the input corpus 134. After generation of the enriched corpus 142, the information retrieval may be extended to the enriched corpus 142 as well.

After generating the enriched corpus 142, one or more enriched document clusters 146 may be generated by clustering the enriched corpus 142 based on one or more top enriched n-grams 144 associated with the enriched corpus 142, at step 412. In one embodiment, the top enriched n-grams 144 may indicate enriched topics associated with the enriched corpus 142. In order to determine the top enriched n-grams 144, initially, one or more enriched n-grams may be extracted from the enriched corpus 142. This may be implemented by any keyword extraction algorithm that is known in the field of art. Thereafter, the Term Frequency-Inverse Document Frequency (TF-IDF) scores are calculated for each enriched n-gram in the enriched corpus 142. The calculated TF-IDF scores indicate how frequently an n-gram occurs in a document as opposed to the entire enriched corpus 142. Finally, the top enriched n-grams 144 may be determined by identifying enriched n-grams that have a TF-IDF score greater than a predefined threshold. In one embodiment, the predefined threshold may be user-defined. In one embodiment, the top enriched n-grams 144 may be used to build a domain dictionary. Since the enriched document cluster 146 is generated based on top enriched n-grams 144 and since the top enriched n-grams 144 indicate the enriched topics, this implies that the n-grams in the same enriched document cluster 146 are all part of the same domain. Hence the domain dictionary may be built using the top enriched n-grams 144 and the enriched document clusters 146.

The determined top enriched n-grams 144, may be used to generate the enriched document clusters 146. In one embodiment, the enriched corpus 142 may be clustered based on the top enriched n-grams 144 by implementing a k-means clustering algorithm. In an embodiment, the enriched corpus 142 may be clustered into 'n' number of clusters and 'n' may be determined by an elbow method. In some embodiments, each of the enriched document clusters 146 may be labeled by the corresponding top enriched n-gram 144, that has the highest TF-IDF score. In another embodiment, the enriched document clusters 146 may be manually labeled.

After determining the enriched document clusters 146, one or more n-gram clusters 148 may be determined for each n-gram of the enriched corpus 142, at step 414. The n-gram clusters 148 comprise n-grams that are semantically related to each n-gram of the enriched corpus 142. In one embodiment, all the n-grams in the enriched corpus 142 may be converted to vectors. This may be done using Global Vectors for Word Representation (GLOVE) algorithm, word2vec algorithm or FastText algorithm. In addition to these algorithms, a skip-gram or a Continuous Bag of Words (CBOW) model may be used. The vectors that indicate all the n-grams in the enriched corpus 142 may be clustered using an LDA clustering algorithm. These clusters may be referred to as n-gram vector clusters. The n-gram vector clusters thus formed indicate n-grams that are in the same semantic space, but not necessarily in the same document set. This implies that the same cluster may comprise n-grams from the input documents as well as the external documents.

After determining the n-gram clusters 148, a taxonomy 150 may be created based on the input document clusters 140, the enriched document clusters 146, the n-gram clusters 148 and the top-ranked input n-grams 138, at step 416. The taxonomy 150 defines at least one relationship between the input document clusters 140, the enriched document clusters 146, the n-gram clusters 148 and the top-ranked input n-grams 138. The at least one relationship may include semantic relationship, contextual relationship or co-occurring relationship.

After creating the taxonomy 150, one or more documents are retrieved from the enriched corpus 142 based on the taxonomy 150, at step 418.

The disclosed embodiment may provide the following advantage. Since the n-gram clusters 148 only contain semantically similar terms that are present in the enriched corpus 142 and not a universal corpus, the creation of taxonomy 150 requires significantly less time and resources.

Computer System

FIG. 5 is a block diagram of an exemplary computer system 501 for implementing embodiments consistent with the present disclosure. Variations of computer system 501 may be used for implementing the information retrieval device 102. Computer system 501 may comprise a central processing unit ("CPU" or "processor") 502. Processor 502 may comprise at least one data processor for executing program components for executing user- or system-generated requests. A user may include a person using a device such as those included in this disclosure. The processor 502 may include specialized processing units such as integrated system (bus) controllers, memory management control units, floating point units, graphics processing units, digital signal processing units, etc. The processor 502 may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, dongle, microphone, touch screen, touchpad, trackball, stylus, scanner, storage device, transceiver 506, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver 506 may facilitate various types of wireless transmission or reception. For example, the transceiver 506 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices 509, 510, and 511 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices 509, 510, and 511.

In some embodiments, the processor 502 may be disposed in communication with one or more memory devices 515 (e.g., RAM 513, ROM 514, etc.) via a storage interface 512. The storage interface 512 may connect to memory devices 515 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 515 may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems 516 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces 517 may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser 518 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers 518 may utilize facilities such as AJAX, DHTML, Adobe Flash, JavaScript, Java, application programming interfaces (APIs), etc. In some embodiments, the computer system 501 may implement a mail server 519 stored program component. The mail server 519 may be an Internet mail server 519 such as Microsoft Exchange, or the like. The mail server 519 may utilize facilities such as ASP, ActiveX, ANSI C++/C #, Microsoft .NET, CGI scripts, Java, JavaScript, PERL, PHP, Python, WebObjects, etc. The mail server 519 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client 520 may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems 501 discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor 502 may be stored. Thus, a computer-readable storage medium may store instructions for execution by one or more processors 502, including instructions for causing the processor(s) 502 to perform steps or stages consistent with the embodiments described herein. The term "computer-readable medium" should be understood to include tangible items and exclude carrier waves and transient signals, i.e., be non-transitory. Examples include random access memory (RAM 513), read-only memory (ROM 514), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of retrieving one or more documents, the method comprising:
   receiving, by an information retrieval device, an input corpus, wherein the input corpus comprises one or more input documents;
   determining, by the information retrieval device, one or more top input n-grams associated with the input corpus, wherein the one or more top input n-grams is used to generate one or more input document clusters;
   determining, by the information retrieval device, one or more top-ranked input n-grams from the one or more top input n-grams, wherein the one or more top-ranked input n-grams are determined based on relatedness of a top input n-gram with each top input n-gram using Latent Dirichlet Allocation (LDA) algorithm and Gibbs sampling, wherein the one or more top-ranked input n-grams are the one or more top input n-grams that have relatedness above a predefined threshold value;
   identifying, by the information retrieval device, an external corpus based on retrieving one or more external documents by querying one or more external databases with the one or more top-ranked input n-grams;
   merging, by the information retrieval device, the external corpus with the input corpus to generate an enriched corpus;
   clustering, by the information retrieval device, the enriched corpus based on one or more top enriched n-grams associated with the enriched corpus to generate one or more enriched document clusters;
   determining, by the information retrieval device, one or more n-gram clusters corresponding to each n-gram of the enriched corpus, wherein each of the one or more n-gram clusters comprises semantically related n-grams corresponding to each n-gram of the enriched corpus;
   creating, by the information retrieval device, a taxonomy based on the one or more input document clusters, the one or more enriched document clusters, the one or more n-gram clusters and the one or more top-ranked input n-grams, wherein the taxonomy defines at least one relationship between the one or more input document clusters, the one or more enriched document clusters, the one or more n-gram clusters, and the top-ranked input n-grams, and wherein the at least one relationship comprises at least one of semantic relationship, contextual relationship, or a co-occurring relationship, and wherein determining the co-occurring relationship comprises:
      determining a limited span of 1-grams before and after the top-ranked input n-gram in the one or more input documents using a text adjacency graph;
      identifying a number of times, the 1-gram appears along with the top-ranked input n-gram to determine a co-occurrence score;
      determining relationship between the 1-gram and the top-ranked input n-gram as the co-occurring relationship if the co-occurrence score is above a predetermined threshold; and
   retrieving, by the information retrieval device, the one or more documents from the enriched corpus based on the taxonomy.

2. The method as claimed in claim 1, wherein the one or more top input n-grams, the one or more top enriched n-grams and the one or more top-ranked input n-grams comprises at least one of a word, a phrase, or a multiword.

3. The method as claimed in claim 1, wherein at least one of the one or more top input n-grams and the one or more top enriched n-grams is determined based on term frequency—inverse document frequency (tf-idf) scores.

4. The method as claimed in claim 1, wherein the relatedness of a top input n-gram with each top input n-gram comprises a number of top input n-grams related to the top input n-gram.

5. The method as claimed in claim 1, wherein the one or more enriched document clusters are generated by:
   determining the one or more top enriched n-grams associated with the enriched corpus; and
   clustering the enriched corpus based on the one or more top enriched n-grams.

6. The method as claimed in claim 5, wherein the one or more top enriched n-grams associated with the enriched corpus is used to create a domain dictionary.

7. An information retrieval device for retrieving one or more documents, the information retrieval device comprising:
   a processor;
   a memory communicatively coupled to the processor, wherein the memory stores processor-executable instructions, which, on execution, causes the processor to:
      receive an input corpus, wherein the input corpus comprises one or more input documents;
      determine one or more top input n-grams associated with the input corpus, wherein the one or more top input n-grams is used to generate one or more input document clusters;
      determine one or more top-ranked input n-grams from the one or more top input n-grams, wherein the one or more top-ranked input n-grams are determined based on relatedness of a top input n-gram with each top input n-gram, using Latent Dirichlet Allocation (LDA) algorithm and Gibbs sampling, wherein the one or more top-ranked input n-grams are the one or more top input n-grams that have relatedness above a predefined threshold value;
      identify an external corpus based on retrieving one or more external documents by querying one or more external databases with the one or more top-ranked input n-grams;
      merge the external corpus with the input corpus to generate an enriched corpus;
      cluster the enriched corpus based on one or more top enriched n-grams associated with the enriched corpus to generate one or more enriched document clusters;
      determine one or more n-gram clusters corresponding to each n-gram of the enriched corpus, wherein each of the one or more n-gram clusters comprise semantically related n-grams corresponding to each n-gram of the enriched corpus;
      create a taxonomy based on the one or more input document clusters, the one or more enriched document clusters, the one or more n-gram clusters and the one or more top-ranked input n-grams, wherein the taxonomy defines at least one relationship between the one or more input document clusters, the one or more enriched document clusters, the one or more n-gram clusters, and the top-ranked input n-grams, and wherein the at least one relationship comprises at least one of semantic relationship, contextual relationship, or a co-occurring relationship, and wherein determining the co-occurring relationship comprises:

determining a limited span of 1-grams before and after the top-ranked input n-gram in the one or more input documents using a text adjacency graph;

identifying a number of times, the 1-gram appears along with the top-ranked input n-gram to determine a co-occurrence score;

determining relationship between the 1-gram and the top-ranked input n-gram as the co-occurring relationship if the co-occurrence score is above a predetermined threshold; and retrieve the one or more documents from the enriched corpus based on the taxonomy.

8. The information retrieval device as claimed in claim 7, wherein the one or more top input n-grams, the one or more top enriched n-grams, the one or more top-ranked input n-grams comprises at least one of a word, a phrase, or a multiword.

9. The information retrieval device as claimed in claim 7, wherein at least one of the one or more top input n-grams and the one or more top enriched n-grams is determined based on term frequency—inverse document frequency (tf-idf) scores.

10. The information retrieval device as claimed in claim 7, wherein the relatedness of a top input n-gram with each top input n-gram comprises a number of top input n-grams related to the top input n-gram.

11. The information retrieval device as claimed in claim 7, wherein the processor is configured to generate the one or more enriched document clusters by:

determining the one or more top enriched n-grams associated with the enriched corpus; and clustering the enriched corpus based on the one or more top enriched n-grams.

12. The information retrieval device as claimed in claim 11, wherein the one or more top enriched n-grams associated with the enriched corpus is used to create a domain dictionary.

13. A non-transitory computer readable medium including instructions stored thereon that when processed by at least one processor cause a system to perform operations comprising:

receiving an input corpus, wherein the input corpus comprises one or more input documents;

determining one or more top input n-grams associated with the input corpus, wherein the one or more top input n-grams is used to generate one or more input document clusters, using Latent Dirichlet Allocation (LDA) algorithm and Gibbs sampling, wherein the one or more top-ranked input n-grams are the one or more top input n-grams that have relatedness above a predefined threshold value;

determining one or more top-ranked input n-grams from the one or more top input n-grams, wherein the one or more top-ranked input n-grams are determined based on relatedness of a top input n-gram with each top input n-gram;

identifying an external corpus based on retrieving one or more external documents by querying one or more external databases with the one or more top-ranked input n-grams;

merging the external corpus with the input corpus to generate an enriched corpus;

clustering the enriched corpus based on one or more top enriched n-grams associated with the enriched corpus to generate one or more enriched document clusters;

determining one or more n-gram clusters corresponding to each n-gram of the enriched corpus, wherein each of the one or more n-gram clusters comprises semantically related n-grams corresponding to each n-gram of the enriched corpus;

creating a taxonomy based on the one or more input document clusters, the one or more enriched document clusters, the one or more n-gram clusters and the one or more top-ranked input n-grams, wherein the taxonomy defines at least one relationship between the one or more input document clusters, the one or more enriched document clusters, the one or more n-gram clusters, and the top-ranked input n-grams, and wherein the at least one relationship comprises at least one of semantic relationship, contextual relationship, or a co-occurring relationship, and wherein determining the co-occurring relationship comprises:

determining a limited span of 1-grams before and after the top-ranked input n-gram in the one or more input documents using a text adjacency graph;

identifying a number of times, the 1-gram appears along with the top-ranked input n-gram to determine a co-occurrence score;

determining relationship between the 1-gram and the top-ranked input n-gram as the co-occurring relationship if the co-occurrence score is above a predetermined threshold; and retrieving the one or more documents from the enriched corpus based on the taxonomy.

* * * * *